United States Patent [19]

Grace

[11] Patent Number: 4,624,163
[45] Date of Patent: Nov. 25, 1986

[54] ICE CREAM TUB CUTTER

[76] Inventor: Garland K. Grace, 5705 Criner Rd., Huntsville, Ala. 35802

[21] Appl. No.: 776,513

[22] Filed: Sep. 16, 1985

[51] Int. Cl.$^4$ .................. B26D 1/547; B26D 3/16
[52] U.S. Cl. ........................... 83/411 R; 83/651.1; 83/200.1; 493/290
[58] Field of Search ............. 83/411 R, 926 B, 651.1, 83/200.1; 493/290, 288; 82/101

[56] References Cited

U.S. PATENT DOCUMENTS

| | | | |
|---|---|---|---|
| 173,777 | 2/1876 | Dugan et al. | 83/651.1 |
| 276,199 | 4/1883 | Street | 83/200.1 |
| 802,545 | 10/1905 | Ames | 82/101 X |
| 2,489,784 | 11/1949 | Kerr | 83/200.1 |
| 3,138,186 | 6/1964 | Laudien | 83/411 R |
| 3,898,898 | 8/1975 | Peres | 82/101 X |

*Primary Examiner*—James F. Coan
*Attorney, Agent, or Firm*—C. A. Phillips

[57] ABSTRACT

An ice cream tub cutter in which a tub of ice cream is clamped to a turntable between two posts. Adjustable in height sleeves are mounted on these posts, and a knife is mounted on one of them to make an initial cut, this being through the cover of the tub of ice cream and is accomplished by rotation of the turntable with the knife in engagement with the cover. A wire extends between the sleeves at the same elevation as the knife cut, and an adjustably tensioned spring applies tension to the wire to effect cutting the ice cream as the tub of ice cream is rotated a second time.

5 Claims, 8 Drawing Figures

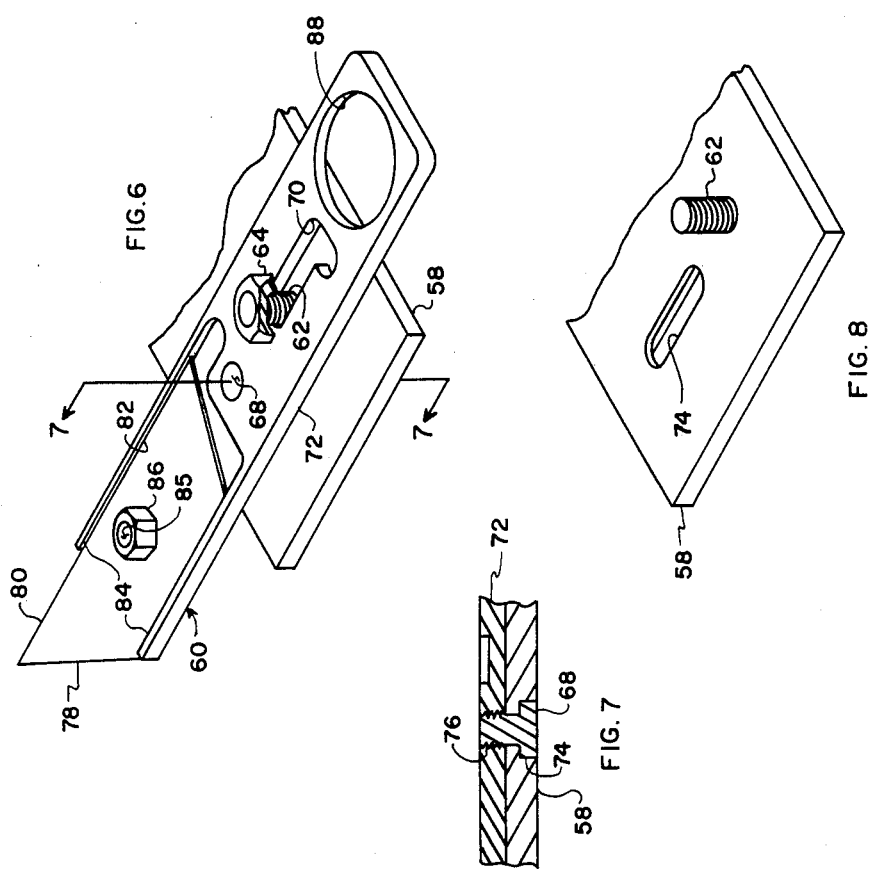
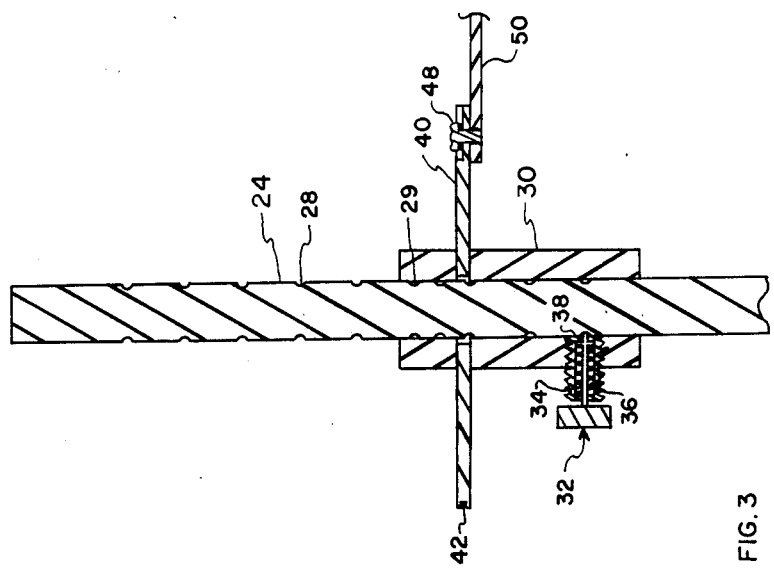

ICE CREAM TUB CUTTER

BACKGROUND OF THE INVENTION

1. Field of the Invention

This invention relates generally to wire-type food cutting devices, and particularly to a device for cutting layers of ice cream.

2. Description of the Related Art

Ice cream is typically sold to retail outlets in three-gallon containers or tubes, these being approximately 9.5 inches in diameter and 10.3 inches high and are formed of a paper board construction. There is frequent demand for the cutting of layers of ice cream, typically one or two inches thick which are then used in decorative dessert arrangements. In order to evenly cut a layer and for it to retain its shape, the ice cream must be fairly hard; and in this state, it is a rather substantial job. In fact, it is practically impossible to do this by hand. As a result, some softening of the ice cream is effected prior to an attempted cut, and not infrequently, a deformed cut occurs. Since one of the principal purposes of cutting ice cream into layers is to accomplish a decorative layer, the result is unsatisfactory. Accordingly, there is a real need for a machine which will enable one to make an even cut on hard ice cream and with little effort on the part of the user.

SUMMARY OF THE INVENTION

In accordance with this invention, a turntable is positioned between two vertical posts and vertically adjustable sleeves are positioned on these posts. An extendable knife is supported on one of the sleeves and an adjustably tensioned wire extends between the sleeves. By this combination, a tub of ice cream would be mounted on and rotated by the turntable and, in sequence, first the knife would be moved against an outer cover of the tub to cut it and then the wire would be tensioned through this cut and thereby effect cutting the ice cream.

BRIEF DESCRIPTION OF THE DRAWINGS

FIG. 3 is a view as seen along line 4—4 of FIG. 1.

FIG. 6 is a pictorial view, partially cut away, of a knife assembly.

FIG. 7 is a sectional view taken along line 6—6 of FIG. 1.

FIG. 8 is a pictorial view, partially broken away, of the base of the knife assembly.

DESCRIPTION OF THE PREFERRED EMBODIMENT

Figures 1, 2:
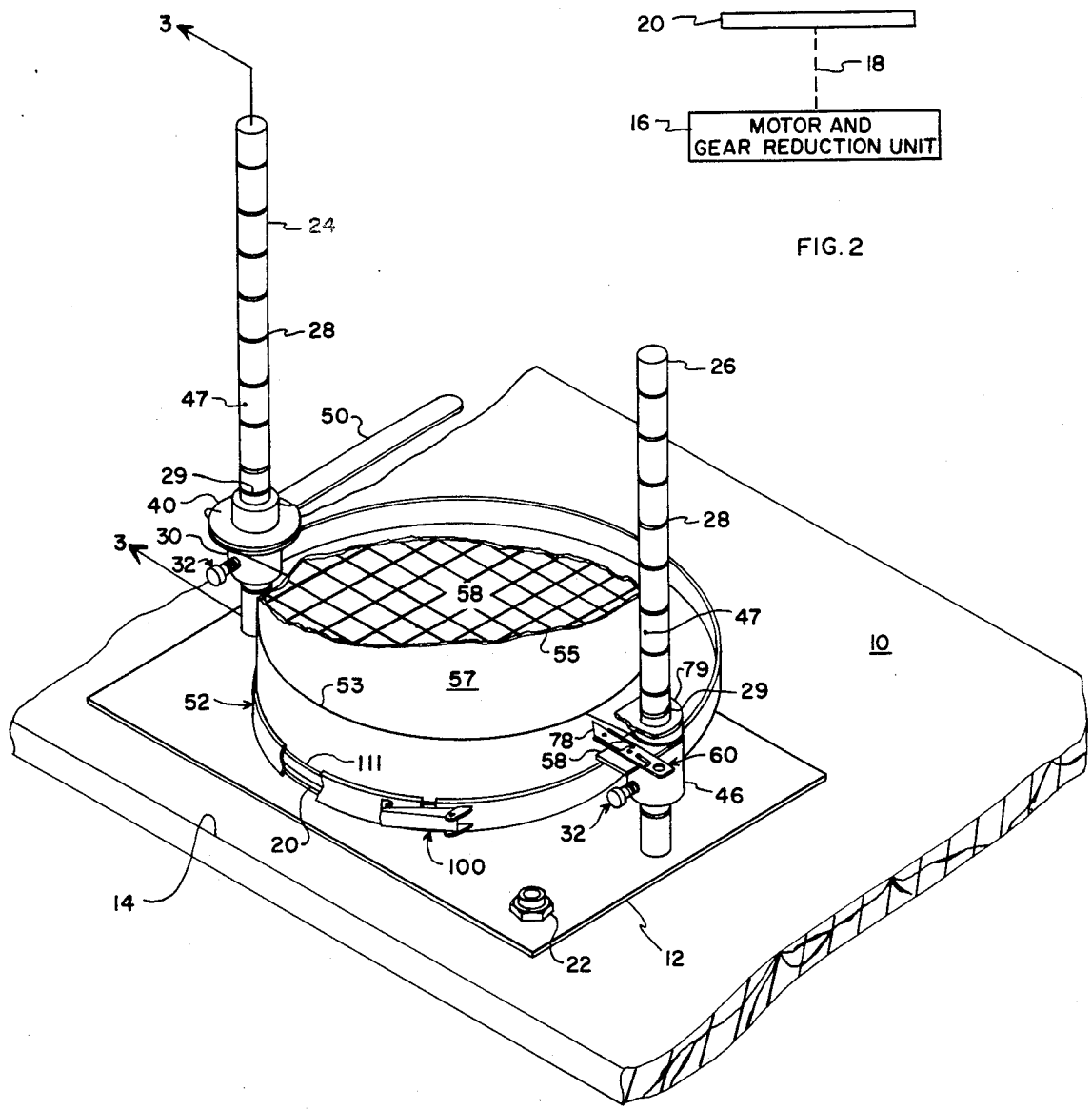
FIG. 1 is a pictorial view generally illustrating the structure of an embodiment of the invention.
FIG. 2 diagrammatically illustrates the drive mechanism employed by the embodiment shown in FIG. 1.

Referring now to the drawings, FIG. 1 illustrates the configuration of the ice tub cutter of this invention. It is supported on a countertop 10, being generally held by a metal plate 12 supported on the top side 14 of counter 10. A motor and gear unit 16 (FIG. 2) are located beneath the work surface 10 and drive, via a shaft indicated by broken line 18, a turntable 20 whereby rotation of 25 to 35 rpm in the direction of arrow 21 (FIGS. 4 and 5) is controlled by a push button switch 22 which is operated on for rotation of turntable 20. A post 24 extends upward on and from plate 12 on one side of turntable 20, and an identical post 26 is supported by and extends upward from plate 12 on a generally opposite side of turntable 20. Posts 24 and 26 have spaced grooves 28, spaced at equal spacings of, for example, 0.875 inch. An additional groove 29 is formed in each of posts 24 and 26 of a height above turntable 20 such that an even one gallon of ice cream may be cut just above the turntable, as will be further described.

Sleeve 30 is mounted to post 24 and is locked into one of grooves 28 or 29 by a locking pin assembly 32. Locking pin assembly 32 includes a locking pin 34 (FIG. 3) which is biased inwardly by a spring 36 attached to a shoulder 38 mounted on pin 34. As shown in FIG. 3, locking pin assembly 32 is mounted within the wall of sleeve 30, and locking pin 34 is resting withine one of grooves 28. In this manner, sleeve 30 is locked at a selected elevation. Sleeve 30 includes a pulley 40 rotably mounted on it (by means not shown) around which pulley wire 42 passes. Wire 42 is connected by a mounting bolt 44 (FIGS. 4 and 5) to a second sleeve 46 on post 26 at one end, and the other end is connected to bolt 48 which extends through pulley 40. Bolt 48 threads into and thereby attaches an operating handle 50 to pulley 40. By rotation of handle 50, wire 42 is movable to the position shown in FIG. 5 wherein it would be behind a tub of ice cream when positioned on turntable 20, preparatory to a cut. A tub of ice cream is held on turntable 20 by a rim assembly 52 (FIGS. 1, 4, and 5) basically formed of two rim members 54 and 56.

Sleeve 46 has an internal diameter to slidably fit over post 26. It, too, like sleeve 30, includes a locking pin assembly 32 which locks sleeve 46 to post 26. Further, it incorporates a shelf 58 upon which there is mounted a knife assembly 60 (FIGS. 7, 8, and 9) which is slidably mounted on threaded stud 62 and a lock nut 64 within an L-shaped slot 70. Plate 58 includes a slot 74 through which a cap screw 68 provides a second sliding securing point of base 72 to shelf 58, being threaded in place by threaded opening 76 in base 72. Knife blade 78, having reversible cutting edges 80 and 82, is mounted in a slot 84 of base 72 and is held to the latter by bolt 85 and nut 86. Knife assembly 60 is conveniently movable for the positioning of the knife blade in an outward, operable, position (and retraction) by finger opening 88, knife base 72 being slidable in slots 70 and 74 along a line as indicated by arrow 90. Knife blade 78 is also in the same horizontal plane as wire 42 so that a cut 53 made by knife 78 in cover 55 of tub 57 is coordinate with wire 42 when knife 78 is retracted. A guard 79 is attached to the top portion of sleeve 46 to prevent accidental engagement with knife 78.

Rim member 56 is permanently attached to turntable 20, as by welding, and rim member 54 movably attached to member 56. Ends 90 and 92 of rim members 54 and 56 are coupled by a hinge 94 and opposite ends 96 and 98 are coupled together by an adjustable take-up conventional clamp assembly 100 when, in a closed or locked position, is as illustrated in the drawings. In an unlocked position, arm 102 would be rotated counterclockwise and outward by this operation, and latch member 104 would disengage with latch member 106 which is attached to rim end member 96. By this operation, rim members 96 and 98 would be moved apart for the insertion of a tub 57 of ice cream 58 on turntable 20. Spurs 108 and 110 extend inward from rim members 54 and 56, respectively, and assist in gripping the cover 55 (FIG. 1) of a tub 57 of ice cream 58 and preventing slippage with respect to the turntable with cutting pressure being applied to a tub. Alternately, and as illustrated in FIG. 1, a band 111 of rubber dimensioned to be stretched and applied over a tub 57, prior to being placed on turntable 20, would be employed. This would provide a frictional grip between rim members 54 and 56 and the tub of ice cream, making unnecessary spurs 108 and 110.

Figure 4:
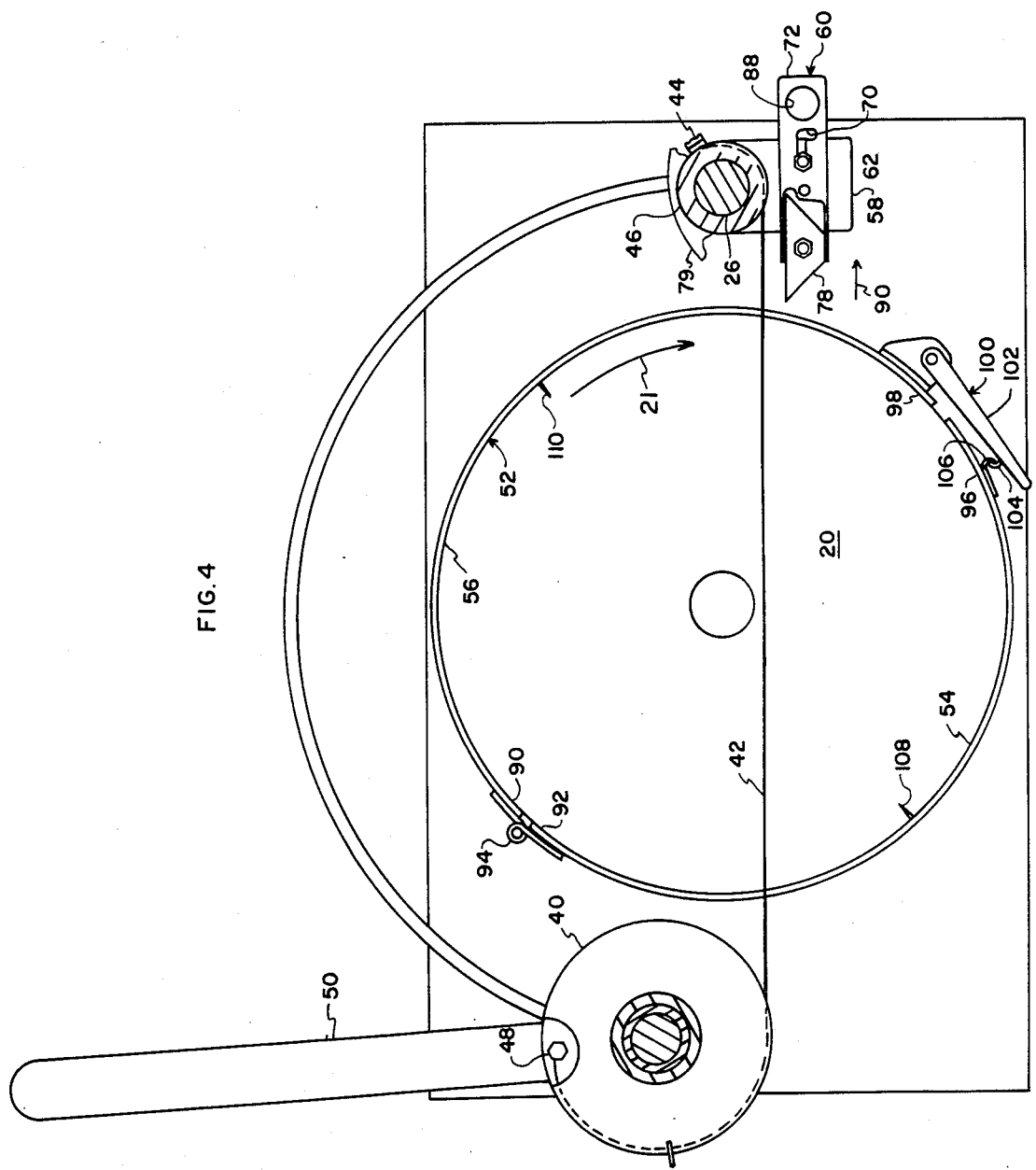
FIG. 4 is a plan view of the mechanism of the embodiment of the invention as oriented during a cutting operation.
Figure 5:
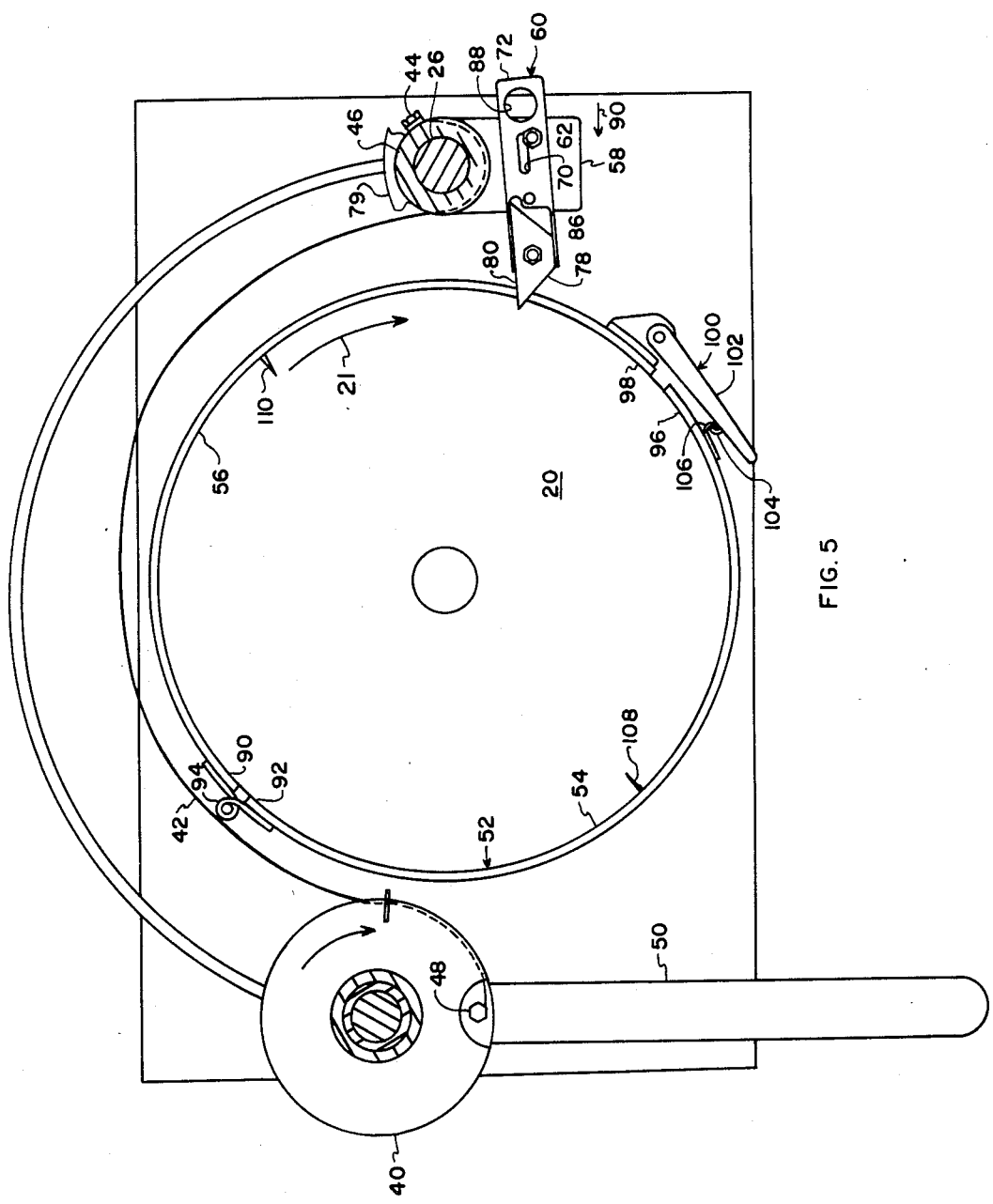
FIG. 5 is a plan view of the embodiment of the invention as oriented prior to the commencement of a cut.

To examine operation of the machine, it will be assumed that a tub 57 of ice cream 58 has been placed on turntable 20 and latched in place by latch 104 being placed over latch 106 and arm 102 rotated clockwise and inward to the position shown (FIGS. 4 and 5). Then, the cylinder above the bottom of tub 57 (or distance from the top) would be selected in order to determine the position of the first cut. With this done, sleeves 30 and 46 would be moved to an appropriate position and locking pins 36 of locking assemblies 32 inserted in grooves 28 on posts 24 and 26 to lock the cutting height of the machine where desired. For example, these locking grooves are 0.875 inch distance apart so that one can cut slices at this spacing. Of course, groove spacing may be varied as desired.

With the position of first cut thus established as described, knife assembly 60 would be operated from the postion illustrated in FIG. 4, with the knife blade retracted, to a cutting position (and where it is locked) as shown in FIG. 5. This movement of knife assembly 60 would be made after having first pressed switch 22 and turntable 20 rotating. This will produce a cut 53 in the cover 55 of tub 57 (FIG. 1). Following this, knife assembly 60 would be withdrawn back to the position shown in FIG. 3 wherein the end of knife blade 78 is free of cover 55. Following this, handle 50, initially in the position shown in FIG. 5, would be rotated clockwise and wire 42 would be drawn into cut 53 made in cover 55 by knife blade 78 and cutting of ice cream in tub 57 would commence. The radial position of bolt 48 holding wire 42 on pulley 40 and the position of wire 42 as wound around sleeve 46 are such that when wire 42 is stretched taut (FIG. 4) by rotation of handle 50 that there will have been a complete cut through the ice cream upon rotation of the tub of ice cream. On completion of the cut, and assuming no other cut is to be made, handle 50 would simply be returned to the positon shown in FIG. 5, arm 102 of clamp assembly 100 moved to unlatch member 104, and the now two pieces of ice cream be removed. Where additional cuts are to be made, of course, the sleeves would be moved vertically to a selected position in order to make these cuts and the process just described repeated. Where it is desired to set the device to cut an even gallon of ice cream, sleeves 30 and 46 would be adjusted in elevation where dots 47 are just viewable along the top of sleeve 30 and plate guard or cover 79. At this point, grooves 29 of posts 24 and 26 would be engaged by locking pins of locking pin assembly 32 to lock sleeves 30 and 46 to the posts.

The invention claimed is:

1. An ice cream tub cutter comprising:
   (A) a turntable and vertical axle centrally coupled to an underside of said turntable and rotation means for rotating said turntable;
   (B) clamping means for clamping a tub of ice cream to said turntable;
   (C) first and second generally vertical posts generally positioned on opposite sides of said turntable;
   (D) first and second vertically movable sleeves, said first sleeve being around said first post, and said second sleeve being around said second post, and locking means for locking a said sleeve to a said post at a selected position along a said post;
   (E) cover cutting means vertically alignable with one of said sleeves for adjustable positioning against a said tub and for cutting a cover on a said tub at a selected elevation as said turntable is rotated;
   (F) a wire connected between said sleeves and vertically alignable with the elevation of a cut made by said cover cutting means; and
   (G) tension means for selectively tensioning said wire in an opening of said cover effected by said cover cutting means and causing said wire to cut through a said tub of ice cream at a selected vertical location.

2. An ice cream tub cutter as set forth in claim 1 further comprising a bridge member coupled between said sleeves, said bridge member being offset to pass around a said tub of ice cream when positioned on said turntable.

3. An ice cream tub cutter as set forth in claim 1 wherein each said post has a set of like vertically positioned grooves, and each said sleeve includes locking means for selectively locking said sleeves to like elevation grooves whereby selected elevations of cuts may be made.

4. An ice cream tub cutter as set forth in claim 2 wherein each said post has a set of like vertically positioned grooves, and each said sleeve includes locking means for selectively locking said sleeves to like elevation grooves whereby selected elevations of cuts may be made.

5. An ice cream tub cutter as set forth in claim 4 wherein said cover cutting means is supported by and alignable with said first sleeve, and said tension means comprises a lever supported by said second sleeve and coupled to said wire.

* * * * *